UNITED STATES PATENT OFFICE.

CHARLES SORLEY, OF NEW YORK, N. Y., ASSIGNOR TO THE ANGLO-AMERICAN ELECTRIC LIGHT MANUFACTURING COMPANY, OF WEST VIRGINIA.

METHOD OF TREATING SECONDARY-BATTERY PLATES.

SPECIFICATION forming part of Letters Patent No. 419,727, dated January 21, 1890.

Application filed November 12, 1889. Serial No. 330,052. (No specimens.)

*To all whom it may concern:*

Be it known that I, CHARLES SORLEY, of the city, county, and State of New York, have invented a new and useful Improvement in Treating Storage-Battery Plates, of which the following is a specification.

It is well known that when the support or grid of a storage-battery plate is packed with active material in a dry pulverized state, and then placed suddenly in the electrolyte of the cell, gas forms between the particles of said active material and blows out or detaches the same from the support. To avoid this difficulty the active material is either combined directly with a liquid and so made into a paint, paste, or cement, and in this condition placed in the support and there allowed to set or harden, or else, after the plate is packed, the active material therein is moistened with fluid and a setting of the material produced before the plate is immersed in the battery-electrolyte.

By the process which constitutes my present invention a preferably dry powder is compacted into the grid or support by suitable pressure, hydraulic or otherwise, and the plate is at once immersed in the battery-fluid in the battery in which said plate is used, no other liquid being applied to said plate and no previous setting of the active material being by any other means produced.

I carry my process into effect as follows: I first pack in the grid, support, or plate, active material in the form of dry powder, using hydraulic, hand, or other suitable pressure to insure compactness. I then place a proper amount of electrolytic liquid in the cell and then very slowly lower the plate into said liquid. This slow and gradual immersion of the packed plate is essential, and its result is the complete prevention of the detaching or disintegration of the active material by the action of contained air or generated gas. Instead of the air or gas being imprisoned in the active material, as is the case when the plate is—as it is commonly—rapidly immersed in the liquid, the gradual and slow immersion of the plate allows time for the thorough infiltration of the fluid and the gradual expulsion of air or escape of gas from the mass of active material as the liquid-level on the plate rises. The rate at which the liquid should be allowed to cover the plate is easily determined by experiment for plates of any given dimensions. If the immersion is too rapid, the active material will be seen to disintegrate; but this effect will cease as soon as the immersion is reduced to the proper speed. After that point is reached greater slowness is immaterial and usually advantageous. As soon as the plate is in the proper place in the cell the latter may be at once used, and the ordinary charging operation proceeded with. It is to be particularly noted that while I consider it beneficial and preferable that the plate (after the immersion is completed) be not removed and put in another fluid and there charged or used, but that it be practically employed for electrical storage purposes in the same fluid; yet, nevertheless, I do not herein limit my invention to a plate charged in the same fluid in which it is slowly immersed, because said plate may, if desired, be immersed, as described, in a different fluid, and subsequently placed in the battery-fluid.

In order to exhibit one practical and operative mode in which my invention may be carried into practice to produce beneficial results, I will state that I find that the plate should be lowered into the liquid previously in the cell at the rate of six inches per minute. This is the fastest rate of speed. A lower rate is, however, beneficial, or, in other words, the result will be better the more slowly the immersion takes place; and, therefore, the time may be increased to one or two hours with advantage.

I claim—

1. The method of treating storage-battery plates, which consists first in packing a grid, support, or electrode with active material in a dry pulverulent state and then gradually and slowly immersing said plate in an electrolyte.

2. The method of treating storage-battery plates, which consists first in packing a grid, support, or electrode with active material in a dry pulverulent state, then gradually and slowly immersing said plate in an electrolyte, and then charging said plate in said electrolyte.

CHARLES SORLEY.

Witnesses:
S. O. EDMONDS,
PARK BENJAMEN.